United States Patent
Shuvali et al.

(10) Patent No.: US 10,496,392 B2
(45) Date of Patent: Dec. 3, 2019

(54) STAGED APPLICATION ROLLOUT

(71) Applicant: ENTIT Software LLC, Sunnyvale, CA (US)

(72) Inventors: Haim Shuvali, Yehud (IL); Avi Kabizon, Yehud (IL); Amichai Nitsan, Yehud (IL)

(73) Assignee: MICRO FOCUS LLC, Santa Clara, CA (US)

( * ) Notice: Subject to any disclaimer, the term of this patent is extended or adjusted under 35 U.S.C. 154(b) by 0 days.

(21) Appl. No.: 15/742,677

(22) PCT Filed: Jul. 9, 2015

(86) PCT No.: PCT/US2015/039775
§ 371 (c)(1),
(2) Date: Jan. 8, 2018

(87) PCT Pub. No.: WO2017/007488
PCT Pub. Date: Jan. 12, 2017

(65) Prior Publication Data
US 2018/0203684 A1    Jul. 19, 2018

(51) Int. Cl.
*G06F 8/65*    (2018.01)
*G06F 8/71*    (2018.01)
*G06F 11/34*   (2006.01)

(52) U.S. Cl.
CPC ............... *G06F 8/65* (2013.01); *G06F 8/71* (2013.01); *G06F 11/3438* (2013.01)

(58) Field of Classification Search
None
See application file for complete search history.

(56) References Cited

U.S. PATENT DOCUMENTS

| 8,135,775 B1* | 3/2012 | Anderson | G06F 8/61 |
| | | | 709/203 |
| 10,248,628 B2* | 4/2019 | Hassan | G06F 11/3688 |
| 2007/0157195 A1* | 7/2007 | Gaa-Frost | G06F 8/60 |
| | | | 717/174 |

(Continued)

FOREIGN PATENT DOCUMENTS

WO    WO-2001041014 A1    6/2001

OTHER PUBLICATIONS

Apptimize, Feature Flagging and Staged Rollout, Website (http://apptimize.com/docs/advanced-functionality/feature-flagging-and-staged-rollout), Dec. 4, 2015, 7 pgs.

(Continued)

*Primary Examiner* — Wei Y Zhen
*Assistant Examiner* — Binh Luu

(57) ABSTRACT

Examples include a user segmentation system for staged application rollout. In an example, an application usage engine receives data for users including a number of screens used in an application version and a number of user actions used in the application version. A staged rollout engine determines, for each user, an early adopter probability based on the number of screens used in the application version and the number of user actions used in the application version, and in some examples a preconfigured factor or weighting. For a subsequent application version, staged rollout groupings are determined. Users are assigned to staged rollout groupings based on the early adopter probabilities.

16 Claims, 4 Drawing Sheets

(56) References Cited

U.S. PATENT DOCUMENTS

| | | | |
|---|---|---|---|
| 2008/0141240 A1* | 6/2008 | Uthe | G06F 8/61 |
| | | | 717/174 |
| 2009/0222811 A1 | 9/2009 | Faus et al. | |
| 2010/0185630 A1 | 7/2010 | Cheng et al. | |
| 2011/0004868 A1 | 1/2011 | Bharadwaj | |
| 2011/0282735 A1* | 11/2011 | Kordis | G06F 8/71 |
| | | | 705/14.49 |
| 2014/0019228 A1 | 1/2014 | Aggarwal et al. | |
| 2014/0032656 A1 | 1/2014 | Hyman et al. | |
| 2014/0189648 A1 | 7/2014 | Everitt | |
| 2014/0282400 A1* | 9/2014 | Moorthi | G06F 8/71 |
| | | | 717/122 |
| 2015/0012838 A1* | 1/2015 | Hegstad | H04W 4/00 |
| | | | 715/745 |
| 2015/0088968 A1 | 3/2015 | Wei et al. | |
| 2015/0095321 A1* | 4/2015 | Procopio | G06F 16/24578 |
| | | | 707/723 |
| 2015/0143345 A1 | 5/2015 | Patton et al. | |
| 2015/0195179 A1* | 7/2015 | Skare | G06F 8/71 |
| | | | 715/745 |
| 2015/0370909 A1* | 12/2015 | Volach | G06Q 30/0269 |
| | | | 707/722 |
| 2017/0366433 A1* | 12/2017 | Raleigh | H04L 67/2804 |
| 2018/0095869 A1* | 4/2018 | Peer | G06F 11/3688 |
| 2019/0155591 A1* | 5/2019 | Kumar | G06F 8/71 |

OTHER PUBLICATIONS

Google Developer Console Help, Use Alpha/Beta testing & Staged Rollouts, webpage (https://support.google.com/googleplay/android-developer/answer/3131213?hl=en), 10 pgs.

Mixpanel, Mobile A/B Testing, Website (https://mixpanel.com/mobile-ab-testing/), Dec. 4, 2015, 4 pgs.

Myrlund, J., User Adaptation in Anonymous Web Applications, (Research Paper), Jun. 2014, 66 Pages.

Optimizely, Mobile A/B Testing, Website (https://www.optimizely.com/mobile/), Dec. 4, 2015, 10 pgs.

Taplytics, Mobile A/B Testing for iOS & Android, Website (https://taplytics.com/mobile-ab-testing), Dec. 4, 2015, 7 pgs.

Taplytics, Staged Rollouts for iOS, May 15, 2014, Website (https://blog.taplytics.com/feature-spotlight-staged-rollouts-ios/), 2 pgs.

International Searching Authority., International Search Report and Written Opinion dated Mar. 29, 2016 for PCT Application No. PCT/US2015/039775 Filed Jul. 9, 2015, 9 pgs.

* cited by examiner

STAGED APPLICATION ROLLOUT

BACKGROUND

Computing systems, devices, and electronic components may run or execute applications stored on the systems, devices, or components as machine readable instructions. The applications may be released by software developers in a series of versions, with newer versions of an application introducing new features or functions, and/or including patches to resolve existing errors in the application code. New versions of an application may also introduce unexpected errors upon distribution to users.

BRIEF DESCRIPTION OF THE DRAWINGS

The following detailed description references the drawings, wherein.

DETAILED DESCRIPTION

Figure 1:
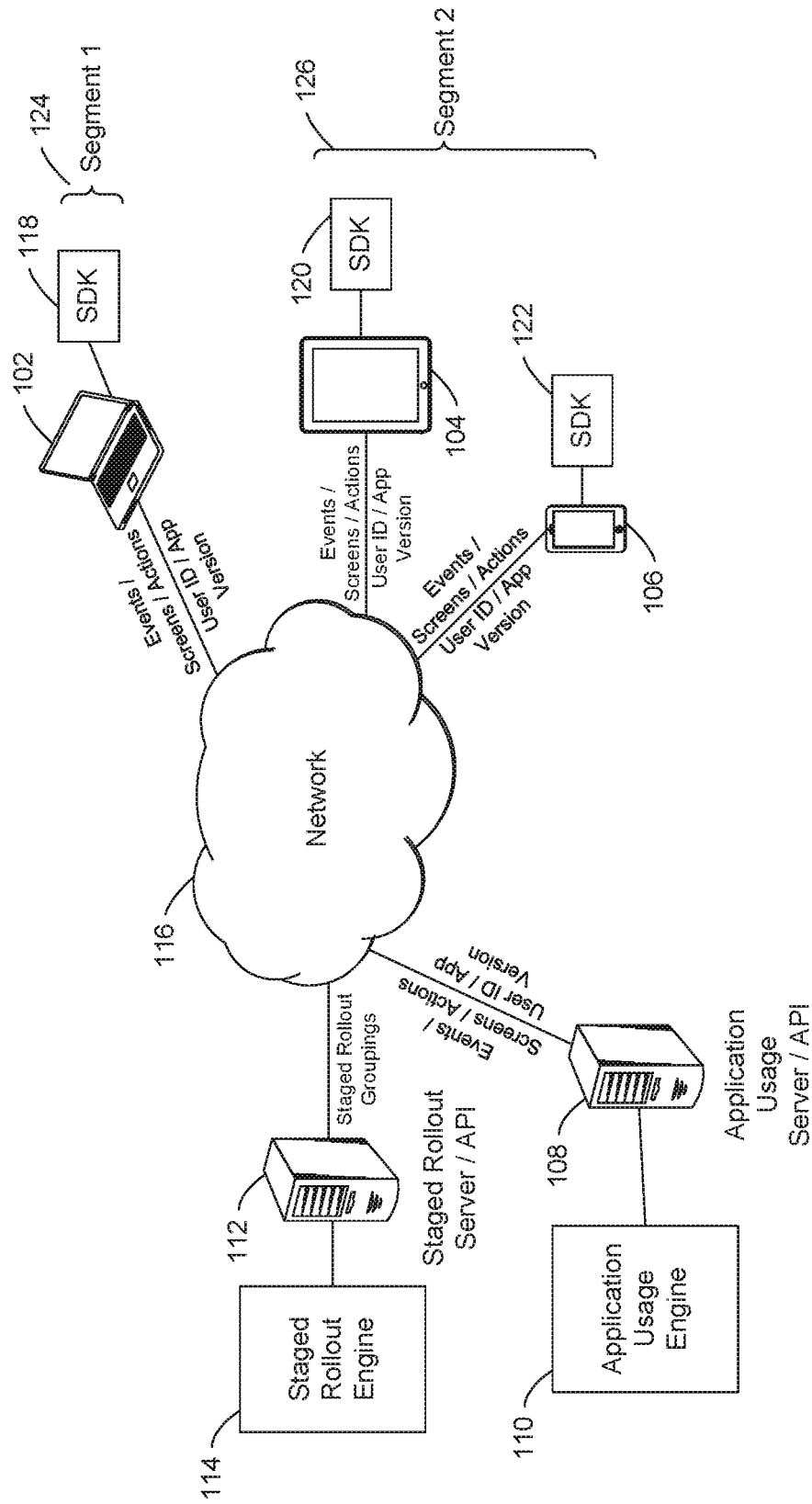
FIG. 1 is a block diagram of a system to segment users for a staged application rollout, according to an example.

Various examples described below provide for a user segmentation system for staged application rollout. In an example, an application usage engine receives data for users including a number of screens used in an application version and a number of user actions used in the application version. A staged rollout engine determines, for each user, an early adopter probability based on the number of screens used in the application version and the number of user actions used in the application version, and in some examples a preconfigured factor or weighting. For a new, updated, or subsequent application version, staged rollout groupings are determined. Users are assigned to staged rollout groupings based on the early adopter probabilities.

Software development and distribution may be based on a model where incremental versions of a software application may be released to a user, with each new version introducing new features or functions, and/or including patches to resolve existing errors or "bugs" in the application code. With the adoption of downloadable software in particular, users have become accustomed to frequent software updates or upgrades, either in the form of minor updates, e.g., from version 1.0 to 1.1 or in the form of major updates, e.g., from version 1.0 to 2.0.

Although the distribution or "rollout" of a new version may introduce new features or resolve old bugs, a new version may itself introduce new bugs, compatibility issues, or configuration issues. In some cases, a new feature or bug in a new version may affect the overall stability of the entire application. Similarly, new features introduced in a new version may not function as intended, may be difficult to use, or otherwise may not achieve user adoption.

Staged rollouts may be used to roll out a new version of an application to, for example, a small number of users as a test prior to releasing the version to all users. In some examples, staged rollouts may include two, three, or an even greater number of groupings, successively releasing a new version of an application to a greater number of users as confidence in the new version grows.

However, releasing a new version to, for example, a random group of users or a group based on demographic attributes may not result in a test group that is likely to test new features, thereby exposing a potentially flawed new version to a group of users that are not the optimal users to test the new version. An approach that increases the probability that a user in a test segment is a user that will use new features in a new version is desirable. Such users may be referred to as, for example, early adopters. Such an approach may, for example, minimize the exposure of a new version to a smaller number users that will provide more significant feedback and validation than a larger number of random users, thereby reducing the potential impact of a flaw in the new version and improving validation and feedback to developers.

In an example, collection of user statistics and data relating to, for example, usage and event data for a particular application by a particular user may be used to calculate an early adopter probability for each user. Users may then be assigned to staged rollout groupings in the most effective manner.

Referring now to the drawings, FIG. 1 is a block diagram of a system to segment users for a staged application rollout, according to an example.

In the example of FIG. 1, user devices such as laptop 102, tablet 104, and/or smartphone 106 (hereinafter "computing devices" or "user devices") may run or execute applications, which may comprise machine-readable instructions that run or execute on the devices. For example, the applications running on laptop 102, tablet 104, and/or smartphone 106 may be word processing tools, spreadsheet tools, presentation tools, programming tools, communications tools, utilities, games, or other applications.

In the example of FIG. 1, devices such as servers 108 and 112 (hereinafter "computing devices" or "servers") may also run or execute applications, including machine-readable instructions. For example, the applications running on servers 108 and 112 may be applications, engines, controllers, circuitry, or modules to monitor or analyze usage of applications running on other devices, or to perform a distribution or "rollout" of software, such as rolling out updated software versions to a plurality of user groups or user segments, e.g., groups of devices such as laptop 102, and/or tablet 104 and smartphone 106, as determined by the applications running on servers 108 and 112. In some examples, servers 108 and/or 112 may run the applications on a software as a service ("SaaS") framework, or a big data framework.

Computing devices 102-106 and servers 108 and 112 may include a processing resource and a machine-readable storage medium comprising or encoded with instructions executable by the processing resource, as discussed below in more detail with respect to FIGS. 2-4. In some examples, the instructions may be implemented as engines comprising any combination of hardware and programming to implement the functionalities of the engines or controllers, as described below.

In examples described herein, such combinations of hardware and programming may be implemented in a number of different ways. For example, the programming for the controllers or engines may be processor executable instructions stored on a non-transitory machine-readable storage medium and the hardware for the engines may include a processing resource and/or circuitry to execute those instructions. In such examples, the machine-readable storage medium may store instructions that, when executed by the processing resource, implement the engines of systems 108 and 112. In some examples, a plurality of machine-readable storage media and/or processing resources may be used.

As used herein, a computing device may be a server, blade enclosure, desktop computer, laptop (or notebook) computer, workstation, tablet computer, mobile phone, smart device, or any other processing device or equipment including a processing resource. In examples described herein, a processing resource may include, for example, one processor or multiple processors included in a single computing device or distributed across multiple computing devices.

In some examples, the applications running on user devices 102, 104, and 106 may include or communicate with a software development kit ("SDK") or application programming interface ("API") or other tool for purposes of monitoring usage of applications on those devices. In other examples, the applications running on devices 102, 104, and 106 may be monitored by another device, server, or process, such as an external monitoring tool. In such examples, the external monitoring tool may query the devices directly, such as through a "pull" configuration, or may monitor data exported or transmitted from the devices, such as in a "push" configuration.

Data monitored on user devices 102, 104, and 106 from applications running on the devices may include data related to screens or actions in the application. As discussed below in more detail, data related to screens or actions may include, for example, a number or percentage of old or new screens used in an application version, and/or a number or percentage of new or old user actions used in the application version. In some examples, historical data from old versions may be archived, fetched, or otherwise accessed or stored such as in a database.

For example, the data may indicate that a user had used or accessed 4 existing or old screens in version 1.0 of an application, and used or performed 10 old or existing actions or functions in version 1.0, while the same user had used or accessed 2 new screens added in version 2.0 and used or performed 3 new actions added in version 2.0. Such data may also be expressed in percentages, such as that the user had used 50% of old or existing screens in a previous version, or 20% of new screens added in an updated version.

Screens may be labeled or identified by a unique identifier, such as a serial number, or by a name, such as Home, Login, Settings, or User Management, as examples. Similarly, actions may be labeled or identified by a unique identifier, such as a serial number, or by a name, such as "Tapped on Delete Button" or "Tapped on Save Button" as examples.

Data monitored on user devices 102, 104, and 106 from applications running on the devices may also include data related to the user or the application, such as a user ID, an application ID, an application version, or other data or metadata useful in determining an early adopter probability or a staged rollout assignment for a user. The monitored data may also include event data, such as user interface responsiveness data, network error data, and/or application crash data.

Data monitored on user devices 102, 104, and 106 may be received, processed, or analyzed on, for example, application usage server 108 and/or in application usage engine 110.

Data received, processed, or analyzed on, for example, application usage server 108 may be used on the server, or on staged rollout server 112 or staged rollout engine 114 to determine an early adopter probability for a user. As discussed below in more detail, the early adopter probability may be based on, e.g., the number of screens used in an application version or versions and the number of user actions used in an application version or versions, and/or a preconfigured factor.

For a version of an application, such as a new or updated application to be released, e.g., to user devices 102-106, staged rollout groupings may be determined. e.g. on server 112. For example, a determination may be made that a new application version be rolled out in two segments. In some examples, a developer may desire that a first segment comprise small group of users, such as users that are known to use new screens or actions in an application and can provide a useful test base, while a second segment may comprise a larger group of users who are less likely to use new screens or actions in the updated application.

Users, such as those associated with user devices 102-106, may be assigned to a staged rollout grouping based on the early adopter probability. For example, if the user associated with laptop 102 is known to have a high likelihood of being an early adopter, user 102 may be assigned to first segment 124. If users associated with tablet 104 and smartphone 106 are determined to be less of an early adopter type than user 102, users 104 and 106 may be assigned to a second segment 126. Segment 126 may receive a new version of an application after segment 124, and in some cases, only after the users of segment 124 have validated or fully tested the new version.

In the example of FIG. 1, user devices 102, 104, and 106, and servers 108 and 112 may communicate over network 116 via, e.g., a network interface device. Network 116 may be a local network, private network, public network, or other wired or wireless communications network accessible by a user or users. As used herein, a network or computer network may include, for example, a local area network (LAN), a wireless local area network (WLAN), a virtual private network (VPN), the Internet, or the like, or a combination thereof. In some examples, a computer network may include a telephone network (e.g., a cellular telephone network). In examples described herein, devices that communicate on network 116 may include a network interface device that may be a hardware device to communicate over at least one computer network. In some examples, a network interface may be a network interface card (NIC) or the like installed on or coupled to, for example, user devices 102, 104, and 106, and servers 108 and 112.

Figure 2:
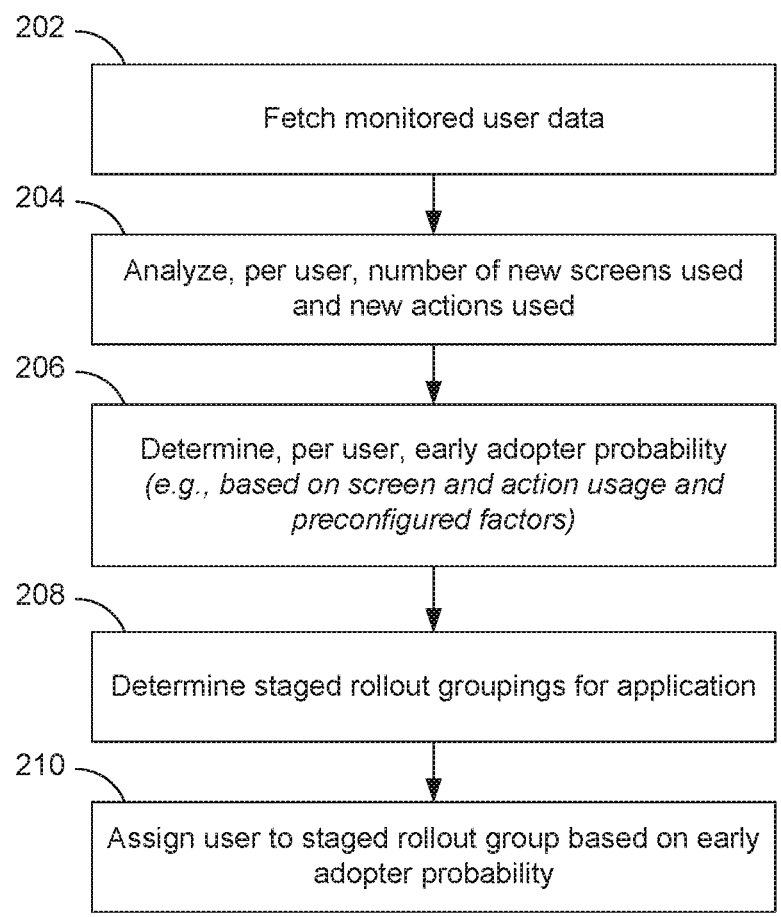
FIG. 2 is a flowchart of segmenting users for a staged application rollout, according to an example.

FIG. 2 is a flowchart of segmenting users for a staged application rollout, according to an example.

In block 202, monitored user data is fetched. The data may be, as discussed above, data related to screens or actions and may include, for example, a number or percentage of old or new screens used in an application version, and/or a number or percentage of new or old user actions used in the application version. As mentioned above, historical data may also be fetched.

In block 204, a number of screens used by the user and/or a number of actions used by the user may be analyzed, totaled, summed, or calculated, as examples. In some examples, other data may be fetched or calculated to provide insight as to usage by a particular user or groups of users. For example, a number of screens and/or number of actions may be fetched for other users in the same application, or in similar or different applications, across a single version or multiple versions.

In block 206, an early adopter probability may be determined for each user. The early adopter probability may be based on the number of screens used by the user and/or a number of actions used by the user, alone or in combination with a preconfigured factor or weighting, as discussed below in more detail with respect to FIG. 3.

In block 208, staged rollout groupings for the application are determined. As discussed above, in an example, a determination may be made that a new application version should be rolled out in 2 segments, while in another example, 10 segments may be used. Such a determination may be fetched from or stored in a preconfigured user segmentation setting.

In block 210, a user is assigned to a staged rollout group based on the early adopter probability. For example, a user with a high early adopter probability may be assigned to a first grouping that is to receive a new version of an application prior to users with lower early adopter probabilities. Users with lower early adopter probabilities may be assigned to groupings that are to receive the new application version later in time.

Figure 3:
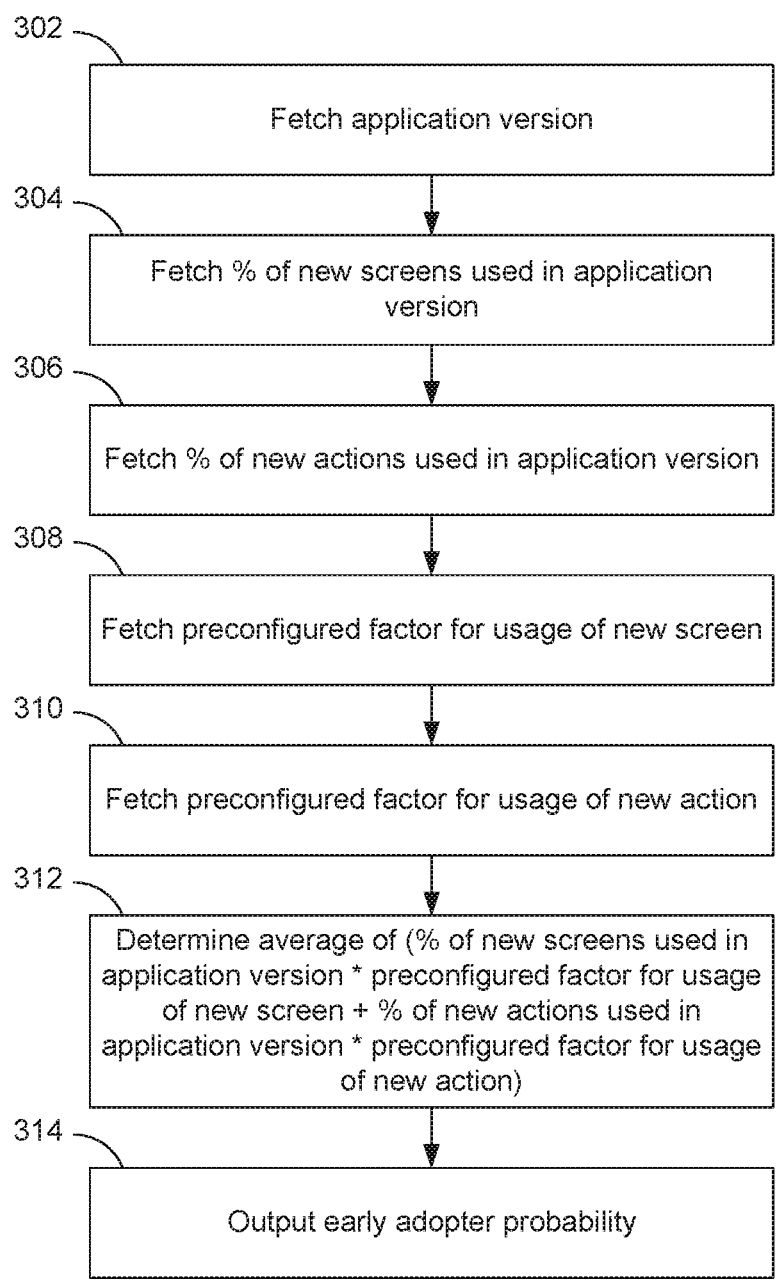
FIG. 3 is a flowchart of determining an early adopter probability, according to an example.

FIG. 3 is a flowchart of determining an early adopter probability, according to an example.

In block 302, an application version is fetched. The version or version number may be used to identify which version data is being collected for analysis.

In block 304, a percentage of screens used in the application version is fetched, and in block 306, a percentage of actions used in the application version is fetched.

In block 308, a preconfigured factor for usage of screens is fetched, and in block 310, a preconfigured factor for usage of actions is fetched. For example, a preconfigured factor for usage of screens may be 0.6, while a preconfigured factor for usage of actions may be 0.4, each of which may be an input into the calculation of block 312 to weight the value of each.

In block 312, in an example, an early adopter probability is determined for each user of each version of an application. The early adopter probability may be, in an example, calculated with the percentage of screens used in an application version multiplied by a preconfigured factor for usage of screens plus the percentage of actions used in the application version multiplied by a preconfigured factor for usage of actions. Other parameters, such as a total amount of usage of an application, either per user or across a pool of users, may be an input into the calculation of block 312.

In an example where there are multiple versions of an application, the early adopter probability for each may be calculated in block 312 and then averaged to provide a single early adopter probability for a user. In some examples, data or early adopter probabilities from different applications for a single user may also be averaged.

In one example, a preconfigured factor for usage of new screens may be set to 0.6, and a preconfigured factor for usage of new actions may be set to 0.4. In this example, a user may have used 3 out of 4 screens in version 1.0 of an application, and 14 out of 20 actions in version 1.0. The user may have then used 1 out of 1 new screens in version 2.0 of the application, and 3 out of 4 new actions in version 2.0. An early adopter probability for version 1.0 may be calculated, in such an example, as 3/4*0.6+14/20*0.4, or 0.73. An early adopter probability for version 2.0 may be calculated as 1/1*0.6+3/4*0.4, or 0.9.

In such an example, the two early adopter probabilities may then be averaged to arrive at an overall early adopter probability of 0.815 (or 81.5%) that the user will be an early adopter of a new version of the application or another application, or new features or functions in a new version. As discussed herein, the early adopter probability of 81.5% may be higher than other early adopter probabilities for other users, meaning the user with the early adopter probability of 81.5% should be in an earlier staged rollout grouping than a user or users with a lower early adopter probability.

In block 314, the early adopter probability may be output, such as to a staged rollout engine 114, and as described in block 206 of FIG. 2. In some examples, the early adopter probability or staged rollout groupings may be sent to an application or "app" store responsible for distributing applications or version updates to users.

Figure 4:
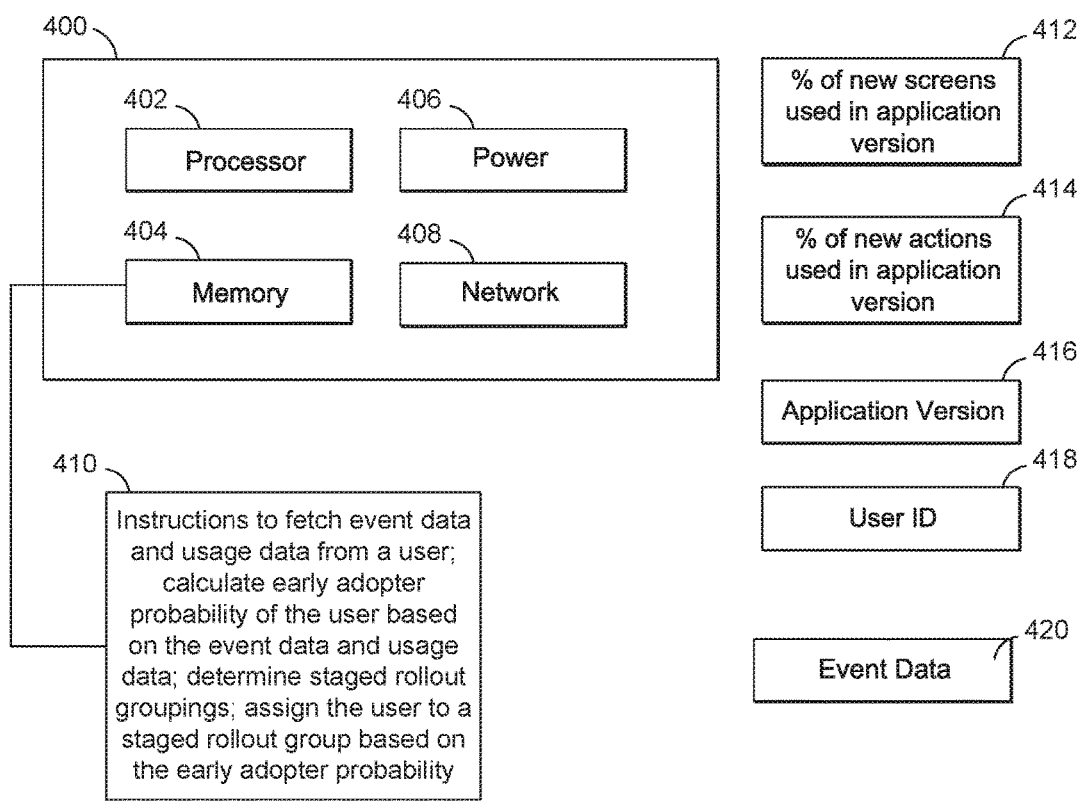
FIG. 4 is a block diagram of a system to segment users for a staged application rollout, according to an example.

FIG. 4 is a block diagram of a system to segment users for a staged application rollout, according to an example The computing system 400 of FIG. 4 may comprise a processing resource or processor 402. As used herein, a processing resource may be at least one of a central processing unit (CPU), a semiconductor-based microprocessor, a graphics processing unit (GPU), a field-programmable gate array (FPGA) configured to retrieve and execute instructions, other electronic circuitry suitable for the retrieval and execution of instructions stored on a machine-readable storage medium, or a combination thereof. Processing resource 402 may fetch, decode, and execute instructions, e.g., instructions 410, stored on memory or storage medium 404 to perform the functionalities described herein. In other examples, the functionalities of any of the instructions of storage medium 404 may be implemented in the form of electronic circuitry, in the form of executable instructions encoded on a machine-readable storage medium, or a combination thereof.

As used herein, a "machine-readable storage medium" may be any electronic, magnetic, optical, or other physical storage apparatus to contain or store information such as executable instructions, data, and the like. For example, any machine-readable storage medium described herein may be any of Random Access Memory (RAM), volatile memory, non-volatile memory, flash memory, a storage drive (e.g., a hard drive), a solid state drive, any type of storage disc (e.g., a compact disc, a DVD, etc.), and the like, or a combination thereof. Further, any machine-readable storage medium described herein may be non-transitory. In examples described herein, a machine-readable storage medium or media is part of an article (or article of manufacture). An article or article of manufacture may refer to any manufactured single component or multiple components. The storage medium may be located either in the computing device executing the machine-readable instructions, or remote from but accessible to the computing device (e.g., via a computer network) for execution.

In some examples, instructions 410 may be part of an installation package that, when installed, may be executed by processing resource 402 to implement the functionalities described herein in relation to instructions 410. In such examples, storage medium 404 may be a portable medium, such as a CD, DVD, or flash drive, or a memory maintained by a server from which the installation package can be downloaded and installed. In other examples, instructions 410 may be part of an application, applications, or component(s) already installed on a computing device 102-106 or 108 or 112 including a processing resource. In such examples, a storage medium may include memory such as a hard drive, solid state drive, or the like.

System 400 may also include a network interface device 408, as described above, which may receive data such as data 412-420, e.g., via a network. System 400 may also include persistent storage and/or memory. In some examples, persistent storage may be implemented by at least one non-volatile machine-readable storage medium, as described herein, and may be memory utilized by system 400 for monitoring data, determining an early adopter probability, and/or segmenting users for staged application rollout. Memory may be implemented by at least one machine-readable storage medium, as described herein, and may be volatile storage utilized by system 400 for performing the processes as described herein, for example. Storage 404 may be separate from a memory. In some examples, a memory may temporarily store data portions while performing processing operations on them, such as calculating an early adopter probability.

The instructions in or on the memory or machine-readable storage of system 400 may comprise an application usage engine 110 and a staged rollout engine 114. In block 410, the instructions may fetch event data and usage data from a user and calculate an early adopter probability based on the event data and usage data. Event data 420 may include data such as user interface responsiveness data, network error data, and application crash data. Usage data may include data such as a number or percentage of screens used in an application version 412, a number or percentage of new actions used in an application version 414, an application version number 416, and a user ID 418.

A staged rollout grouping may be determined, and the user may be assigned to a staged rollout group based on the early adopter probability. In the example of FIG. 4, the event data such as user interface responsiveness data, network error data, and application crash data may be used to augment the calculation of the early adopter probability. For example, an application associated with a user with crash data that is above an accepted average may be used to artificially weight that user lower on the early adopter probability scale.

Although the instructions of FIGS. 2-4 show a specific order of performance of certain functionalities, the instructions of FIG. 4 are not limited to that order. For example, the functionalities shown in succession may be performed in a different order, may be executed concurrently or with partial concurrence, or a combination thereof.

All of the features disclosed in this specification (including any accompanying claims, abstract and drawings), and/or all of the elements of any method or process so disclosed, may be combined in any combination, except combinations where at least some of such features and/or elements are mutually exclusive.

What is claimed is:

1. A system for staged application rollout of an application, comprising:
    a processor; and
    a non-transitory storage medium storing instructions executable on the processor to:
        receive data for a first user from an application programming interface, the data including a number of screens used in a first application version of the application and a number of user actions used in the first application version;
        determine, for the first user, a first early adopter probability based on the number of screens used in the first application version and the number of user actions used in the first application version;
        determine, for the first application version, a plurality of staged rollout groups;
        receive further data for the first user from the application programming interface, the further data including a number of screens used in a second application version of the application and a number of user actions used in the second application version;
        determine, for the first user, a second early adopter probability based on the number of screens used in the second application version and the number of user actions used in the second application version;
        aggregate the first early adopter probability and the second early adopter probability to compute an aggregate early adopter probability;
        assign the first user to a first staged rollout group of the plurality of staged rollout groups based on the aggregate early adopter probability; and
        control distribution of a new version of the application to devices of users in the plurality of staged rollout groups at respective different times, wherein the distribution includes a distribution of the new version of the application to a device of the first user in the first staged rollout group earlier than a distribution of the new version of the application to a device of a user in a second staged rollout group of the plurality of staged rollout groups.

2. The system of claim 1, wherein the instructions are executable on the processor to assign a second user with an early adopter probability lower than the aggregate early adopter probability of the first user into the second staged rollout group.

3. The system of claim 2, wherein the instructions are executable on the processor to release the new version of the application to the second staged rollout group based on a trigger that a release of the new version of the application to the first staged rollout group is successful.

4. The system of claim 1, wherein the instructions are executable on the processor to receive event data comprising network error data and application crash data, wherein the determining of the first early adopter probability is further based on the event data.

5. The system of claim 1, wherein the determining of the first early adopter probability is further based on a first weighting of the number of screens used in the first application version and a second weighting of the number of user actions used in the first application version.

6. The system of claim 5, wherein the determining of the first early adopter probability is based on the first weighting multiplied by the number of screens used in the first application version, and the second weighting multiplied by the number of user actions used in the first application version.

7. The system of claim 1, wherein the aggregating of the first early adopter probability and the second early adopter probability is part of averaging a plurality of early adopter probabilities for different versions of the application.

8. A method performed by a system comprising a hardware processor, comprising:
    fetching event data and usage data for users, the usage data for a first user of the users comprising a first number of screens used by the first user and a first number of actions performed by the first user with a first version of an application, and a second number of screens used by the first user and a second number of actions performed by the first user with a second version of the application;
    calculating a first early adopter probability for the first user based on the event data, the first number of screens, and the first number of actions;
    calculating a second early adopter probability for the first user based on the event data, the second number of screens, and the second number of actions;
    aggregating the first early adopter probability and the second early adopter probability to compute an aggregate early adopter probability;

determining a plurality of staged rollout groups for the application;

assigning the first user to a first staged rollout group of the plurality of staged rollout groups based on the aggregate early adopter probability; and controlling distribution of a further version of the application to devices of users in the plurality of staged rollout groups at respective different times, wherein the distribution includes a distribution of the further version of the application to a device of the first user in the first staged rollout group earlier than a distribution of the further version of the application to a device of a user in a second staged rollout group of the plurality of staged rollout groups.

9. The method of claim 8, wherein the event data comprises one or more of application crash data, user interface responsiveness data, and network data.

10. The method of claim 8, wherein the aggregating comprises computing an average of the first early adopter probability and the second early adopter probability.

11. The method of claim 8, further comprising assigning a second user to the second staged rollout group based on an early adopter probability computed for the second user that is less than the aggregate early adopter probability.

12. An article comprising at least one non-transitory machine-readable storage medium comprising instructions executable by a processing resource to:

fetch event data and usage data for users, wherein the usage data for a first user of the users comprises a first number of screens used by the first user with a first version of an application, a first number of actions performed by the first user with the first version of the application, a second number of screens used by the first user with a second version of the application, and a second number of actions performed by the first user with the second version of the application;

calculate a first early adopter probability for the first user based on the event data, the first number of screens, and the first number of actions;

calculate a second early adopter probability for the first user based on the event data, the second number of screens, and the second number of actions;

aggregate the first early adopter probability and the second early adopter probability to compute an aggregate early adopter probability;

determine a plurality of staged rollout groups for the application;

assign the first user to a first staged rollout group of the plurality of staged rollout groups based on the aggregate early adopter probability; and control distribution of a further version of the application to devices of users in the plurality of staged rollout groups at respective different times, wherein the distribution includes a distribution of the further version of the application to a device of the first user in the first staged rollout group earlier than a distribution of the further version of the application to a device of a user in a second staged rollout group of the plurality of staged rollout groups.

13. The article of claim 12, wherein the instructions are executable further to determine the plurality of staged rollout groups based on a user segmentation setting.

14. The article of claim 12, wherein the event data comprises application crash data.

15. The article of claim 12, wherein the event data comprises user interface responsiveness data.

16. The article of claim 12, wherein the event data comprises network data.

* * * * *